(12) United States Patent
Eklund

(10) Patent No.: US 6,392,584 B1
(45) Date of Patent: May 21, 2002

(54) SYSTEM AND METHOD FOR DETECTING AND WARNING OF POTENTIAL FAILURE OF ROTATING AND VIBRATING MACHINES

(76) Inventor: Richard Eklund, Ramsjövägen 2, 640 45, Kvicksund (SE)

(*) Notice: Subject to any disclaimer, the term of this patent is extended or adjusted under 35 U.S.C. 154(b) by 0 days.

(21) Appl. No.: 09/477,197

(22) Filed: Jan. 4, 2000

(51) Int. Cl.[7] .............................................. G08C 19/12
(52) U.S. Cl. ........................ 341/183; 702/35; 702/185
(58) Field of Search ..................... 364/551.01; 318/558; 702/34, 56; 341/143; 371/22

(56) References Cited

U.S. PATENT DOCUMENTS

| | | | | |
|---|---|---|---|---|
| 4,417,337 A | * | 11/1983 | Favin et al. ................... 371/22 |
| 5,602,757 A | * | 2/1997 | Haseley et al. ........ 364/551.01 |
| 5,619,202 A | * | 4/1997 | Wilson et al. ............... 341/143 |
| 5,943,634 A | * | 8/1999 | Piety et al. .................... 702/56 |
| 5,952,803 A | * | 9/1999 | Canada et al. ............... 318/558 |
| 6,199,018 B1 | * | 3/2001 | Quist et al. ................... 702/34 |

* cited by examiner

*Primary Examiner*—John S. Hilten
*Assistant Examiner*—Douglas N Washburn
(74) *Attorney, Agent, or Firm*—Jeffrey Slusher

(57) ABSTRACT

Vibrations and/or rotations of a machine are sensed, preferably using one or more accelerometers, whose output is sampled by an analog-to-digital converter (ADC) and forms an input signal to a processing system. An alarm that warns of existing or impending failure or defects in the machine is generated whenever an alarm condition is met. The alarm condition is preferably that the kurtosis of the sampled input signal exceeds a predetermined threshold. In order to enable use of the invention with a wide range of machines, and make the system wholly or at least substantially self-calibrating, the processor preferably also adjusts the sampling rate of the ADC as a predetermined function of the input data sets. An auto-ranging feature, which may be implemented within the processor or as a separate circuit, is preferably also included to scale the output signal of the sensor to fall within a predetermined range of the ADC.

6 Claims, 1 Drawing Sheet

SYSTEM AND METHOD FOR DETECTING AND WARNING OF POTENTIAL FAILURE OF ROTATING AND VIBRATING MACHINES

BACKGROUND OF THE INVENTION

1. Field of the Invention

This invention relates to a system and a corresponding method of operation for giving a warning of impending failure of machines based on their vibrations.

2. Description of the Related Art

An ounce of prevention is said to be worth a pound of cure. When it comes to machines failing, however, it is often difficult to prevent a failure without any warning that any failure is imminent.

Most machines operate by generating and applying at least one periodic force to at least one mass in order to cause each mass to rotate, reciprocate, or both. The physical response of the machine to the periodic driving force(s) at any given point can then be determined and analyzed by sensing the vibrations and translations of the machine at that point. Many different types of sensors may be used to sense motions of the machine and generate a signal (usually electrical) that represents the sensed motions. Examples of common include accelerometers, strain gauges, pressure transducers (for indirect measurements via fluids) and even acoustic transducers. Expressed in more mathematical terms, one can attempt at least a partial construction of the machine's transfer function.

The responsive motions of the machine may then be analyzed in one or both of two main ways, namely, in the frequency domain and in the time domain. Frequency-domain techniques—as their name implies—involve converting and analyzing the measured amplitude response signal into a spectrum. This may be done using analog filters, but is most commonly done by converting the analog output signal from the sensor into digital (numerical) form and then using a Fast Fourier Transform (FFT) routine to estimate the spectrum.

It is known that as the internal wear—particularly on bearings—increases, so too does the energy contained in higher frequencies of the machine's response spectrum. Any increase (especially any relatively sudden) increase in the amplitude of the higher-frequency components of the machine's response spectrum will then indicate an increasing likelihood of wear-induced failure of the machine. Less subtle faults such as an actual mechanical failure within the machine will typically be detectible as even larger and more sudden changes in the spectrum, especially in the high-frequency components, since such faults often give rise to impulsive forces within the machine.

One drawback of frequency-domain techniques is that it assumes some knowledge of the "normal" spectrum of the machine. Some machines, for example, operate normally at much higher frequencies than others, and a sensor tuned for a slower machine would need to be calibrated for a different, high-rpm machine. Frequency-based warning systems must therefore often be calibrated for each machine. Proper calibration is often beyond the level skill of those who work with the machines; at the very least, it is a procedure that one would preferably not have to worry about at all.

In time-domain systems, the response signal of the machine is sensed and digitized as before, but rather than analyzing it into a spectrum, its statistical properties are compiled and analyzed. Most machines operating normally usually display the properties of a stationary stochastic system; sufficiently large and/or sudden deviations from the "normal" statistical profile can then be assumed to indicate a highly likely or increasingly likely or, indeed, an existing internal fault or defect that may lead to failure.

Known statistical parameters of any set of data such as the amplitude measurements of the machine response signal taken during some predetermined interval include the mean (first moment) and standard deviation (second moment).

It has been discovered, however, that the fourth moment of the machine response signal is particularly useful in detecting defects and predicting impending failure. Because the kurtosis parameter is even more sensitive to statistically outlying measurements than are the mean and standard deviation, it is particularly useful for detecting impulsive forces, even when these are small and are superimposed on much stronger low-frequency signal components.

U.S. Pat. No. 4,089,055 (Dyer, et al., May 9, 1978) discloses an electronic monitoring apparatus in which a kurtosis coefficient is calculated for at least two frequency bands of a machine. Variations of the kurtosis coefficient are then detected and used to provide an indication of the condition of an object such as a machine.

One shortcoming of existing machine monitors such as Dyer, which rely on statistical analysis, for example of kurtosis, is that they often require calibration for each particular application. A variation in the level of vibration, for example, can cause the measurement resolution of such known systems to be reduced because of the fixed range of their analog-to-digital conversion circuitry. Another problem is that, with a fixed sampling frequency, they are often sensitive to variations in the fundamental frequency component of the machine, for example, the rotation speed, that is, rpm. As is well known (the Nyquist criterion), the sample rate of an analog signal must be at least twice the lowest frequency component from which accurate information is required. Information contained in higher-frequency components will be aliased and will show up as increased noise in lower frequency components. Note that this phenomenon holds true for all sampling processes, even those in which actual processing of the sampled signals is done in the time domain.

What is needed is therefore a monitoring system that able not only to provide a warning of possible defects within a machine (or similar physical system), but is also able to do so without needing special calibration for each application. In other words, the monitoring system should be either wholly self-calibrating, or at least require less calibration than existing systems when used to monitor a wide variety of machines. The improved system should preferably be able to provide adequate resolution over a wide range of vibration amplitudes, and it should relatively insensitive to variations in the frequency changes (such as operating rpm) of the monitored system. This invention provides such a system.

SUMMARY OF THE INVENTION

The invention provides a system for monitoring the status of a machine comprising a sensor (preferably, one or more accelerometers) that generates an output signal corresponding to motions of the machine at a monitoring point. An analog-to-digital converter (ADC) converter is then used to convert the output signal of the sensor into a series of samples forming a digital input signal. A processor then partitions the digital input signal samples into a plurality of input data sets and calculates an alarm parameter for each data set. The processor then generates an alarm signal when the alarm parameter of at least one data set meets a predetermined alarm criterion. In order to enable use of the invention with a wide range of machines, and to make the system according to the invention wholly or at least substantially self-calibrating, the processor preferably also adjusts the sampling rate of the ADC as a predetermined function of the input data sets. An auto-ranging feature, which may be implemented within the processor or as a separate circuit, is preferably also included to scale the output signal of the sensor to fall within a predetermined range of the ADC.

The preferred alarm parameter is kurtosis, that is, the statistical fourth moment of the samples of each respective data set. The alarm criterion is then preferably that the kurtosis value has exceeded a predetermined threshold. The sensor is preferably a two-axis accelerometer pair so that the system is substantially independent of the mounting orientation of the sensor on the machine.

DETAILED DESCRIPTION

Figure 1:
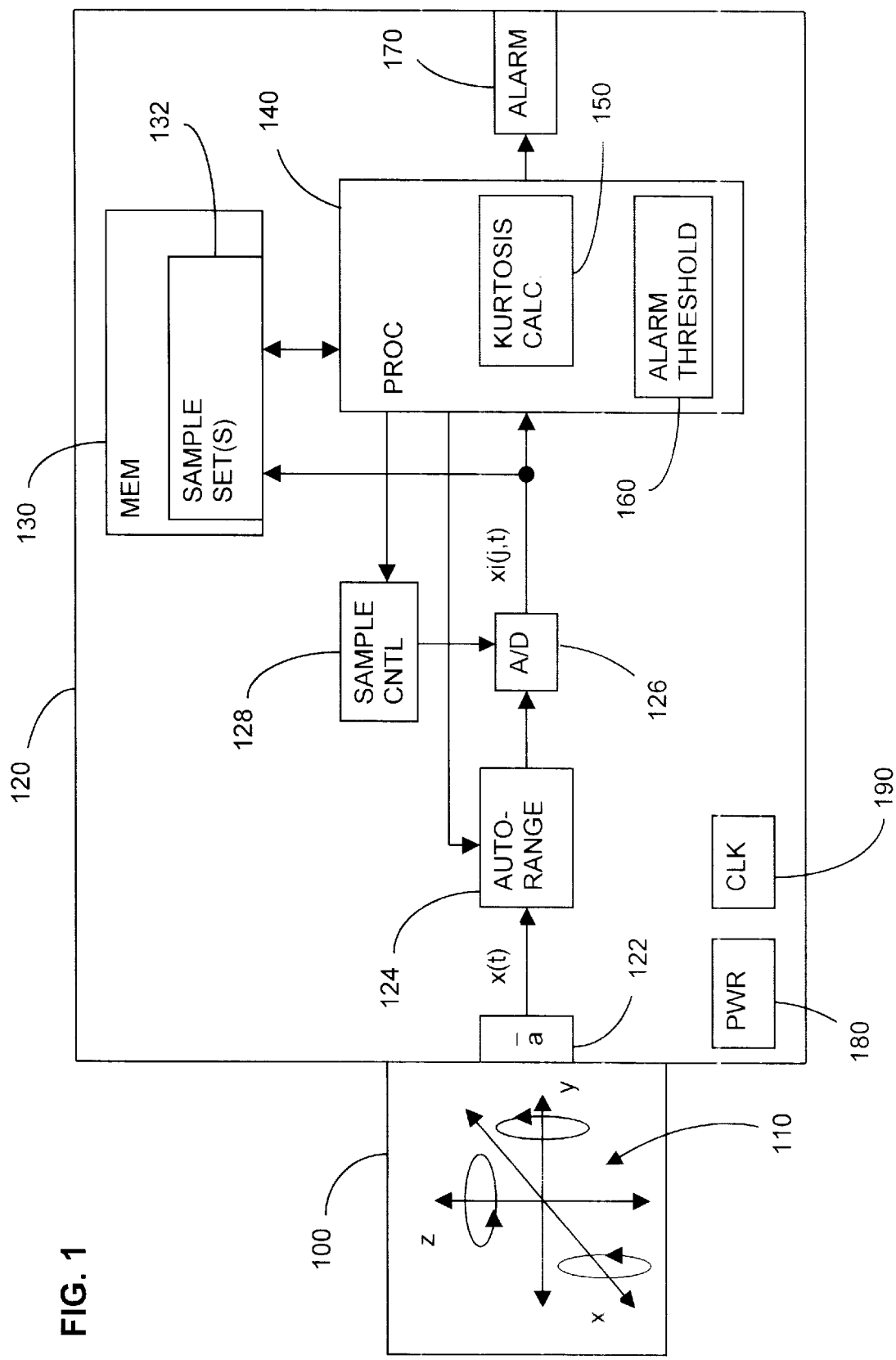
FIG. 1 is a block diagram illustrating both the hardware and functional components of the system according to the invention for monitoring a physical system such as a machine.

The various hardware components of the system according to the invention are described first, followed by a description of the calculations, evaluations and adjustments performed by respective ones of these components.

System Components

In FIG. 1, a monitored object such as a machine 100, whose state the invention is to monitor, is shown as having at least one internal and/or external driving source 110 of vibrations and/or rotations. The term "machine" is used below to indicate any such object to be monitored. In the most general case, each driving source of is illustrated as a six-degree-of-freedom force system. Force systems of lower order are of course also possible. Examples of driving sources 110 include rotating and reciprocating motors, linkages, fluid-driven mechanisms, in short, any known mechanical system with some solid part whose vibrational and/or rotational movements one wishes to monitor. Regardless of the degrees of freedom of the machine 100, up to six-degree-of-freedom motion may arise at any given point in the machine.

A monitor according to the invention is indicated generally by reference number 120. The monitor is preferably mounted on a surface of the machine 100 so that vibrations and rotations of the machine at the mounting point are transmitted with minimal damping to the monitor. For most applications of the invention, the monitor 120 can be made so compact that it consists of a single circuit board (not shown, because such constructions are well known) mounted within a metallic housing, along with motion sensors (which themselves may be mounted on the circuit board) and, as needed, various cables to a power source or to an external monitoring or evaluation system such as a supervisory computer (also not shown).

In many applications of the invention, one will want to monitor the machine permanently, or at least over a long time. In such cases, it will typically be most convenient to mount the monitor 120 on the machine 100 using bolts or screws or other conventional mechanical fasteners. It is also possible, however, to mount the monitor so that it is easier to move, for example, to some other point on the machine, or so as to move the monitor from machine to machine according to some pre-arranged monitoring scheme. One way to provide easily removable mounting is to use magnets on the outer housing of the monitor. If magnets are used, then they should be sufficiently strong and rigid to allow transmission of accelerations from the machine to the monitor with negligible damping.

The monitor 120 includes one or more motion sensors 122. In the preferred embodiment of the invention, the sensors are conventional accelerometers aligned in two orthogonal directions that are tangential to the surface of the machine at the mounting point. Two-axis sensing of accelerations (corresponding to local vibrational motions) will normally provide sufficient information for sensitive detection of existing internal machine defects and impending failure—as long as the accelerometers are mounted orthogonally (or with at least some orthogonal component), then all sufficiently strong tangential accelerations of the machine's surface at the mounting point can be resolved and detected.

Single- or three-axis monitoring may also be used, however, simply by removing one of the two preferred accelerometers, or by incorporating a third accelerometer that is preferably aligned to be orthogonal to the other two.

Conventional micro-machined, silicon-based, surface-mounted piezoelectric accelerometers are preferred as such sensors are widely available, are relatively inexpensive, and are easy to install, even directly on a circuit board, easy to wire into conventional circuitry. Another advantage is that such accelerometers have a fast, substantially linear response, and thus require no scaling or other signal conditioning to provide an output signal whose values can be used directly in the calculations described below.

Other sensors may, however, be used, and will in general be chosen using normal design methods depending on the type of machine to be monitored. For example, for large machines whose response spectrum is strongly dominated by relatively low-frequency components, conventional orthogonally mounted strain gauges may be used to sense the motions of the machine at the mounting point.

The signals from the sensor(s) 122 are either in the form of or are converted (using known techniques) into electrical form. The output signal from each sensor is then preferably scaled in an autorange circuit 124 so as to fall wholly or at least substantially within the range of a conventional analog-to-digital converter (ADC) 126, which, as is well known, samples each sensor output signal at a predetermined sampling rate and, for each sample, generates a digital representation of the sample that can be used in numerical calculations.

The autorange circuit 124 may be implemented using a conventional, digitally controlled, variable-gain amplifier, whose gain is controlled by a signal from the processor 140. In the preferred embodiment of the invention, however, the autorange function is implemented by selecting which of several different available A/D inputs is used as the digitized input signal used in the calculations.

A sample control circuit or module 128 is preferably included either to allow adjustment of the sampling rate of the ADC 126, or to select which samples of the input signal x(t) are included in the calculations used to determine whether an alarm condition exists (see below). The sample control circuit 128 (if it is not implemented as a software module in the processor, see below) may be implemented using known components, and typically functions by changing either the external the clock rate sensed by the ADC 126, or an internal clock that is controllable by an external analog or digital signal, for example, generated by the processor 140. The sample control circuit/module 128—and, indeed, even the autorange circuit 126—may be included in the ADC 126 itself, depending on which conventional device is selected for implementing the ADC. Regardless of how the sampling rate is adjusted, a predetermined number of the sampled values are then stored in a conventional memory 130 as sample sets 132.

The invention also includes a conventional processor 140, such as a microprocessor. In FIG. 1, the block 140 is used to represent the processor functionally, such that various software modules according to the invention are shown within it. Each such software module may be considered to be a separate sub-processing routines, but will in almost all cases be implemented as part of the processor's operational program, which is stored in either internal memory or in the memory 130. These techniques are of course well known.

Two such included software modules are a kurtosis calculation module 150 or routine, and an alarm threshold module or routine 160. These modules are described below.

It is not necessary to implement the ADC 126, the sample controller 128, the memory 130 and the processor 140 as separate devices. Any or all of these may be combined. For example, most standard digital signal processors will include all of these components, as well as enough memory to store sufficient numbers of samples of the input signal to allow for accurate determination of an alarm condition (described below).

In one functioning prototype of the invention, for example, the processor was a Siemens C515C. This processor allows for up to eight separate analog inputs and incorporates ten-bit analog-to-digital converters that operate with a maximum sampling rate of 85 kHz. These features—or analogous features in other conventional processors—make it possible to implement the autorange module 124, the ADC 126, and the sample control module 128 all within a single component, namely, the processor 140.

The processor is connected to an alarm unit 170, which notifies the user whenever the monitor 120 detects a potential defect in the machine 100. The alarm unit includes any conventional visual or audible indicator device such as a light or buzzer, or both. The alarm unit may also instead or in addition include a conventional connector to some external device, such as a supervisory computer system, that senses the presence of a conventional warning signal output from the alarm unit 170 and then provides the user with any conventional audible and/or visual warning indication, such as a noticeable message of a display screen.

The monitor according to the invention also includes other conventional circuitry, such as a power supply 180 and system clock, whose construction and functions are well known. The power supply 180 will of course provide sufficient voltage to drive the various hardware components of the monitor 120. One way to arrange the power supply is to connect the monitor 120 to the power supply of the machine it is to monitor, using conventional connectors and conductors. Another way is to connect the monitor to the normal power net using a standard power cord. In this case, a conventional transformer may be included in the power supply to ensure proper supply voltage for the various hardware components of the invention. The monitor according to the invention may be made essentially self-contained by implementing the power supply as a battery pack of sufficient capacity. This would allow a single monitor to be moved from one machine to another with no need for special connectors or conductors.

A conventional system clock 190 provides the clock signal for timing the processor 140, the A/D converter 126 and other clocked components. This is well known.

It is not necessary for the system according to the invention to be implemented as a self-contained unit. Rather, any or all of the components of the monitor 120, other than the accelerometer(s) 122 may be included in a supervisory computer system. A standard cable or I/O bus connection may then be used to connect the accelerometer(s) with the monitor in the supervisory system.

Input Signals

In the preferred embodiment of the invention, movement of the monitored machine in at least one direction is measured, the measured parameter is converted into an electrical input signal x(t), the input signal is digitized by sampling with A/D conversion, and the digitized input signal is evaluated to determine whether a machine defect is present or is likely to occur. Machine movement is preferably measured using at least one accelerometer 122, which, as is well known, generates an electrical output signal whose amplitude increases (or, in some devices, whose frequency characteristics change) with the amplitude of the local acceleration.

According to the invention, acceleration may be measured in a single direction x, y or z, in any two of these directions, or, indeed, in all three. It is preferably to measure acceleration at least in the two orthogonal directions that are tangential to the surface of the machine 100 at the point where it is being monitored, since this will allow the monitor to be mounted with almost any orientation (in the tangential plane) with no risk of missing vibrations orthogonal to the axis of a single-axis device.

If acceleration is measured along more than one axis, then the monitor may either evaluate each respective accelerometer signal separately and signal the user whenever any of the signals exceeds an alarm threshold (described below), or the signals may be combined so that only a single signal need be evaluated. One way to combine the signals is to form the system input signal as the magnitude of the measured acceleration vector. In other words, let ax(t) and ay(t) be the measured acceleration signals in the x and y directions, respectively. The magnitude $$SQRT(ax(t)^2 + ay(t)^2)$$

where SQRT indicates the square root, can then be used as the composite input signal. Alternatively, the two-axis (or three-axis) acceleration vector may also be resolved using normal quadrature techniques to generate separate magnitude and phase signals that the monitor according to the invention processes identically, but separately. This would, for example, detect even constant-magnitude rotational motion of the machine at the measurement point.

The number and type of input signals to the monitoring system will be chosen by the user using known techniques depending on the type of machine to be monitored. In the description of the invention below, it is therefore assumed that the measurement device 122 generates at least one output signal that is used as the input signal to the monitoring system. This input signal is indicated as x(t). The A/D converter 126 then converts the input signal x(t) into digital (numerical) form.

The processor 140 then selects a predetermined number n of consecutive samples as a data "set" xi(j) corresponding to a predetermined measurement interval and defining a digitized input signal. In other words, the input signal x(t) is partitioned into data blocks, xi(j,t), each including n sampled values (j ranges from 1 to n). x2(3,t) is thus the third sampled value of the second input data set; x4(n,t) is the last-sampled value of the fourth data set; and so on. In one prototype of the invention, each data set comprised 625 ten-bit samples, although the actual number used in any given implementation will be chosen using normal design methods with consideration taken to, among other factors, the maximum sampling rate of the ADC and the available memory space.

Preferred Alarm Criterion—Kurtosis

According to the invention, a statistical parameter is calculated for each data set. If this parameter meets predetermined some alarm criterion, then the processor generates an alarm signal to alert the user of this. The preferred parameter is kurtosis, which is the fourth moment of the digitized input signal. Let K indicate kurtosis. Then:

$$KI = \frac{1}{n\sigma^4} \sum_{j=1}^{n} (xi(j,t) - \mu)^4$$

where:

Ki is the kurtosis value for the i'th data set;

xi(j,t) is the j'th sampled value in the current data set;

$\mu$ is the average or mean of the n values of xi(j,t); and $\sigma$ is the standard deviation of the n values of xi(j,t).

The processor 140 can calculate $\mu$ and $\sigma$ using any conventional routine.

As is well known, K becomes large whenever the distribution of xi(j,t) develops sizeable "tails" that extend much farther from the mean $\mu$ than $\pm\sigma$. For a signal that displays a Gaussian distribution, K=3. According to the invention, the alarm criterion used by the monitoring system is that K exceeds some predetermined threshold value. This value can be determined for any given type of monitored machine using conventional experimental methods; if no information is available about the particular, given monitored machine, then experiments have demonstrated that setting a threshold K=3 provides satisfactory results for a wide range of typical applications.

Advantages of using kurtosis as the alarm parameter are, among others, that it is relatively insensitive to variations in the fundamental frequency (for example, rpm), temperature and load of a wide range of machines. On the other hand, kurtosis is very sensitive to impulsive signals (which generate strong outlying signal components), even when these are superimposed on a strong fundamental frequency component. This means that the monitor according to the invention, when using kurtosis as the evaluation and alarm parameter, requires no complicated calibration when put into operation on a given machine, or, for example, when the machine on which the monitor is mounted changes its vibration profile, for example, when bearings are changed.

Other Alarm Parameters

Other statistical parameters may be used instead of kurtosis, however. For example, for each data set, the processor could calculate the standard deviation $\sigma$. Increases in the standard deviation above a predetermined threshold in less than a predetermined time could then be used to indicate an impending defect. Normal experiments may be used to determine the threshold and time. A warning based on the standard deviation will, on the other hand, be less sensitive to impulsive forces than kurtosis is.

Even parameters other than time-domain, statistical parameters may also be used in the invention. For example, if the spectrum of the input signal x(t) is converted into the frequency domain using a conventional FFT device, the processor could then evaluate the spectrum, determine the machine's fundamental or strongest frequency component, and then activate the alarm, for example, whenever the percentage of energy in components above a predetermined frequency threshold (for example, three or five times the fundamental frequency, either exceeds a predetermined alarm threshold, or increases more than a predetermined amount over a given number of data sets. The disadvantage of such an FFT technique, however, is that it is, by definition, affected by the fundamental frequency component of the machine to be monitored. Changes in the spectrum from one machine to another, or in the normal operational speed of a single machine could then lead to a false alarm.

Alarm Condition

As is mentioned above, the processor 140 activates the alarm unit 170 whenever the kurtosis (or other alarm parameter) exceeds a predetermined threshold. In practice, this too may lead to false alarms in certain situations, for example, if a worker were to accidentally drop a heavy tool onto the monitored machine and create a single impulsive force that is unrelated to the general condition of the machine. The alarm unit 170 (or the processor 140) therefore preferably does not actually give an alarm indication until the alarm condition (for example, K>3) has been met a predetermined number of times during a given time period, a predetermined number of times in a row (for consecutive data sets), or for a predetermined percentage of data sets out of some given total number evaluated per run or per time interval. This feature can be implemented either by using a conventional counter in the alarm unit that increments every time the processor generates an alarm signal to the alarm unit, or as a software counter in the processor.

Automatic Ranging of the Input Signal

Devices with any degree of precision may be used to implement the ADC 126 and the processor 140. Standard microprocessors, for example, common can perform 32-bit arithmetic. ADC's, however, normally have lower precision, since the number of elements needed—or the time needed—to perform a conversion increases rapidly with increasing precision. One advantage of the invention, however, is that it may be implemented using relatively simple, inexpensive, easily obtained conventional devices requiring less power and support circuitry than many conventional high-precision microprocessor implementations. In the prototype of the invention mentioned above, which used a Siemens C515C digital signal processor, only eight significant bits were used in the calculations, which proved sufficient for the calculations of kurtosis.

Kurtosis is a quotient, with a divisor including the fourth power of standard deviation, that is, $\sigma^4$. If the amplification of the input signal from the accelerometer 122 is too low, the kurtosis value K could therefore rise steeply, even though there is no alarm condition at all, simply because of the limited precision of the value $\sigma^4$. Even many other statistical alarm parameters will include a divisor.

In order to use the full dynamic range of the ADC 126, and thus reduce the likelihood of exceeding its range and thereby causing "false alarms," the processor preferably adjusts the gain of the autorange circuit 124 so that the maximum amplitude range of the input signal should lie within the dynamic range of the ADC 126. One way to accomplish this is for the processor to evaluate the mean value of the input signal samples for each data set and then to adjust the gain of the amplifier 124 so that this mean value would lie in the middle of the dynamic range of the ADC. The mean could also be based on averaging over several data sets, possibly using an average, or moving average, value weighted according to the recency of each data set. As long as the range of the following input data set does not deviate significantly from the range of the previous data sets, then the following data set should also lie mostly or wholly within the range of the ADC. Of course, sudden deviations will in most cases justify an alarm in any case.

Another way to ensure that the input signal x(t) remains within the dynamic range of the ADC would be to include an FFT module (either as a hardware component or implemented in software in the processor 130) to generate a spectrum of the current (and possibly a predetermined number of previous) data sets. The gain of the amplifier 124 can then be set so that the amplitude of the fundamental frequency component is, for example, 50% (or some other experimentally predetermined percentage) of the dynamic range of the ADC.

Yet another way to determine whether adjustment of the amplification is needed is to use the nature of the ADC 126 itself: Note that all inputs to an ADC are assumed to represent positive values. For an 8-bit A/D conversion, the input will lie in the range 0–255. If the input is roughly periodic, especially with a strong fundamental component, then it will be centered, thus minimizing the risk of exceeding the limits of the ADC, if its median value is approximately 128, or some other experimentally or theoretically predetermined threshold. Let H and L be the number of samples above and below 128, respectively. For a given sampling rate and a given "window" (the number of samples included in each data set), if there are more values above 128 than below (H/L>1), especially over several data sets, then this will tend to indicate that the input should be scaled down. If H/L is below one, however, increased amplification is indicated. The amplification of the input signal can thus be increased (or decreased) gradually from a predetermined low value until H/L is approximately equal to one.

Still another way for the processor to detect when the input signal is tending to exceed the upper or lower limits of the ADC 126, and then to adjust the gain of the amplifier 124, is for the processor to count the number of times the sampled input signal exceeds a maximum threshold value of the ADC's range. For example, if the ADC has ten-bit resolution, then the input could be scaled to fall always within eight bits. If the ninth bit becomes a "1" after A/D conversion of the input signal, then this would indicate that lower amplification is indicated. In not to prevent the system from "overreacting," to anomalous transients, the system could also maintain a current amplification until the number of times the threshold exceeds a predetermined (by experiment, or even a single time) percentage of the number of samples in the set. The processor then directs the amplifier 124 to reduce (or increase) its gain incrementally, or as a function of the percentage of excessive values, until a data set is generated that does not exceed the bounds of the ADC by more than the predetermined percentage of times.

In the prototype of the invention mentioned above, the processor had eight separate ADC circuits built-in, each with its own input. In the prototype, eight separate conventional amplifiers were attached at the inputs, one per input, with different gains. The accelerometer input signal was then connected via the different amplifiers to all eight ADC inputs. Eight different ADC-converted values of the input signal, with eight different gain levels, were thus simultaneously available to the processor. The processor could then "adjust" the gain of the input signal simply by selecting which built-in ADC's output signal should be used in calculations.

Note that adjusting the gain will not ruin the system's ability to detect errors if kurtosis is used as the alarm parameter: Gain adjustment, which is a linear operation, may change the mean of the input signal, but it will not change the shape of the distribution.

Sample Rate Adjustment

The sample control circuit/module 128 may be implemented as hardware or software. If it is implemented as hardware, then it adjusts the sample rate of the ADC 126 in accordance with a signal from the processor.

In the prototype of the invention mentioned above, in which the processor was the Siemens C515C digital signal processor, the built-in ADC 126 sampled only when triggered by a software command. The sampling rate could thus be easily changed by including in the processor's software a triggering loop with variable delay—the ADC was triggered once per completion of the program loop, whose duration was changed by changing the number of iterations of the loop.

The sample rate of the monitoring system according to the invention should be slow enough to avoid a needlessly large number of samples in each data set, which would slow down the calculation of the alarm parameter, but fast enough to avoid aliasing and to allow the system to detect random transients that might affect the monitored machine. In the preferred embodiment of the invention, in which the monitor is self-calibrating, this problem is compounded by the fact that different monitored machines may have very different vibration characteristics.

In order for the kurtosis calculation to have the greatest meaning, it should preferably be based on samples of the input signal spread over at least one period of its fundamental frequency. On the other hand, too many samples will needlessly increase the need for memory, as well as slow down the calculation of kurtosis. The sampling rate should therefore not be too high, nor too low.

As is well understood, the sampling rate should be set to at least twice the highest frequency component of the input signal whose information is to be extracted; this is of course the well-known Nyquist limit. The sampling rate of the ADC is therefore set to at least twice the highest expected frequency component. It is also known, that, for a wide range of vibrating systems with a fundamental frequency component, one should sample over a period equal to at least three periods (6*pi radians) of the fundamental frequency component.

One way to determine the proper sample rate is to include an FFT module, which can be implemented in software, using conventional techniques, as long as the chosen processor 140 has sufficient resolution and speed; otherwise, a specialized, conventional FFT hardware chip may be included and connected to the processor to indicate the spectrum of the input signal x(t)—since only a rough approximation of the fundamental frequency is needed, and FFT of relatively low order may be used.

Another way to determine what sampling period should be used is for the processor to analyze the each current data set with respect to whether the data represents a full 6*pi radian (three full period) sample of the fundamental frequency of the machine being measured. Assume that the range of the ADC is from 0 to a maximum output value ymax. If the input signal were a pure sine-wave signal (shifted upward—in the positive direction—in amplitude to lie within the range of the ADC), then there would be an identical number of sample values above some threshold value as below; for a pure sine wave, the threshold value would be equal to its DC average.

For a given number of samples in a data set, for example, 625, the processor should then determine what sampling period is needed to ensure that the samples are properly "spaced" out over roughly (at least) three full periods of the fundamental frequency. In the prototype of the invention mentioned above, this was done by selecting a threshold value (a "null value", corresponding approximately to the DC level of a sine wave represented within the range of the ADC) roughly in the middle of the ADC range. The values of the current data set were then scanned sequentially and the number of transitions from below to above the threshold, or vice versa, were counted. Over three periods, the number of transitions—equivalent to zero-crossings of a sine wave—should be six. If the number T of transitions counted was less than six, then this was assumed to indicate that the sampling rate was too high, since the 625 samples did not take long enough to fill three full periods. The sampling rate was then reduced (by changing the iteration limit of the triggering loop) by a factor of 6/T. More than six transitions indicated that the sampling rate was too low, and it was accordingly increased by a factor of T/6.

In order to avoid counting spurious transitions due to higher frequency signal components or noise, a transition was counted only if the transition from below (or above) to above (below) the threshold value was maintained for at least two consecutive sampled values. For example, assume that the threshold value is set to 110 and that sampled data have values:

...100, 105, 111, 112, 115 ... 127, 114, 109, 112, 108, 106 ...

The change in value from 105 (below the threshold) to 111 (above the threshold) would count as a transition because even the following value 112 lies above the threshold. The change from 114 to 109 would not, however, since the following value returns to the other side of the threshold; that is, the transition did not last the required two values. Similarly, the change from 112 to 108 would be counted as a transition, since even the following value 106 is on the same side of the threshold as 108. Of course, one could require the transition to be maintained for more than two samples if even greater confidence is required. The proper number can be chosen using normal experimental and design methods.

Another way to reduce the effect of spurious transitions caused, for example, by transients or high-frequency noise would be for the system to first divide the samples into blocks of several sample values and then to evaluate the average of the values in the blocks with respect to transitions of the threshold. For example, data sets of 625 samples each could be divided into 125 five-sample blocks. As is well known, this averaging process acts as a low-pass filter; other numerical low-pass filtering methods could also be used to determine transitions.

Many modern accelerometers of the type preferably used in this invention include a clock circuit that introduces white noise into the output signal around the null (zero-acceleration) level. In order to prevent such null-level noise from causing the processor to infer too many false transitions, the threshold value should therefore be set slightly above or below the mid range of the ADC. The proper offset can be determined using normal design methods.

Calibration—Fixed, Scheduled and Continuous

One result of the autorange and sample rate adjustment functions in the preferred embodiment is that the invention can be made wholly self-calibrating for a wide range of monitored machines. For example, once the monitor according to the invention is installed on the monitored machine, then it may run in a pre-calibration mode for a predetermined period of time until an input signal amplification and a proper sample rate have been determined and set. The calibration time may be pre-set and based on normal experiments; alternatively, the processor may simply run the autorange and sample rate adjustment routines described above until all input values are within the acceptable ranges of the ADC, with a sample rate that both provides a number of samples per data set that fits in the available memory and also is high enough to avoid aliasing effects. The processor may then switch into a normal operating mode, giving an alarm signal whenever the alarm criterion is met, for example, the calculated kurtosis value is greater than three for the predetermined number of data sets.

Whenever the accelerometer(s) indicates zero acceleration for more than some predetermined time (for example, on minute), then the processor may assume that the monitored machine has been shut down. There is then no need for monitoring and the processor preferably also enters a wait mode. When positive accelerations are once again sensed, then the processor can recalibrate, or use previous values.

The processor may also enter the calibration mode either according to a pre-set schedule, for example, every hour, or day, or other time period, which will depend on the type of machine to be monitored and can be predetermined using normal design methods. Alternatively, the processor may continually monitor the range of the input signal and adjust the sample rate after each new data set (or predetermined number of data sets) is acquired. This would allow for the greatest adaptability of the system, but the recalibration period should be set long enough that most of the time, the system is actually monitoring the machine and not just recalibrating itself. The proper recalibration period can be determined using normal methods.

As is mentioned above, the monitor 120—except for the accelerometer(s), may be incorporated into a supervisory processing system. It is not necessary according to the invention for this connection to be "all or nothing," that is, either completely self-contained or almost completely built into a supervisory system. Rather, for example, the monitor 120 could include the hardware components needed to detect and process the accelerometer's output signals, but the various thresholds and other parameters used in the processing could be downloaded from a supervisory system, via a conventional bus or other standard connector, instead of being fixed and stored permanently in the memory 130. The parameters would then be easy to adjust so that the system could be easily optimized for a given monitored machine at the time of installation.

What is claimed is:

1. A system for monitoring the status of a machine comprising:

a sensor generating an output signal corresponding to motions of the machine at a monitoring point;

an analog-to-digital converter (ADC) converting, at a sampling rate, the output signal of the sensor into a series of samples forming a digital input signal;

processing means:
for partitioning the digital input signal samples into a plurality of input data sets;
for calculating an alarm parameter for each data set;
for generating an alarm signal when the alarm parameter of at least one data set meets a predetermined alarm criterion;
for adjusting the sampling rate of the ADC as a predetermined function of the input data sets;

autorange means for scaling the output signal of the sensor to fall within a predetermined amplitude range of the ADC; and sample control means for automatically adjusting the sampling rate of the ADC so that samples in each data set correspond to samples of the sensor output signal ranging over a full period of a fundamental frequency of the motions of the machine.

2. A system as in claim 1, in which the alarm parameter is kurtosis, that is, the statistical fourth moment of the samples of each respective data set.

3. A system as in claim 1, in which the autorange means is included within the processing means.

4. A system as in claim 1, in which the sensor is a two-axis accelerometer pair, the system thereby being substantially independent of the mounting orientation of the sensor on the machine.

5. A method for monitoring the status of a machine comprising the following steps:

sensing motions of the machine at a monitoring point and generating a sensor output signal corresponding to motions of the machine;

converting, in an analog-to-digital converter (ADC), at a sampling rate, the output signal of the sensor into a series of samples forming a digital input signal;

partitioning the digital input signal samples into a plurality of input data sets;

calculating an alarm parameter for each data set;

generating an alarm signal when the alarm parameter of at least one data set meets a predetermined alarm criterion;

adjusting the sampling rate of the ADC as a predetermined function of the input data sets;

scaling the output signal of the sensor to fall within a predetermined range of the ADC;

automatically scaling the sensor output signal to lie within a predetermined operating range of the ADC; and automatically adjusting the sampling rate of the ADC so that samples in each data set correspond to samples of the sensor output signal ranging over a full period of a fundamental frequency of the motions of the machine.

6. A method as in claim 5, in which the step of calculating the alarm parameter comprises calculating the kurtosis of the signal samples of each input data set.

* * * * *